United States Patent [19]

Wilson, II et al.

[11] Patent Number: 4,490,898

[45] Date of Patent: Jan. 1, 1985

[54] METHOD OF REPAIRING A WATER-COOLED ELECTRODE HOLDER

[75] Inventors: James G. Wilson, II, Huntington; P. Fred Hammers, Barboursville, both of W. Va.

[73] Assignee: Wilson Welding Company, Inc., Huntington, W. Va.

[21] Appl. No.: 485,461

[22] Filed: Apr. 8, 1983

[51] Int. Cl.³ ............................................. B23P 7/00
[52] U.S. Cl. ............................. 29/402.13; 219/301; 29/157.3 R; 29/402.19; 29/402.12; 373/94
[58] Field of Search .............. 219/59.1, 61, 301, 243; 29/157.4, 157.3 R, 401.1, 403.1, 403.2, 403.3, 402.01, 402.03, 402.04, 402.05, 402.06, 402.07, 402.08, 402.09, 402.11, 402.12, 402.13, 402.14, 402.16, 402.18, 402.19; 373/94, 99, 101, 100

[56] References Cited

U.S. PATENT DOCUMENTS

| | | | |
|---|---|---|---|
| 1,842,209 | 1/1932 | Schranz . | |
| 3,151,202 | 9/1964 | Russell | 29/402.13 |
| 3,343,250 | 9/1967 | Berto et al. | 29/423 |
| 4,110,548 | 8/1978 | Dresch et al. | 373/99 |
| 4,342,878 | 8/1982 | Wilson et al. | 373/94 |
| 4,393,565 | 7/1983 | Wilson et al. | 29/157.3 R |

FOREIGN PATENT DOCUMENTS 896826  5/1962  United Kingdom ............ 29/400 N
927871  6/1963  United Kingdom ............ 373/101

Primary Examiner—Howard N. Goldberg
Assistant Examiner—V. K. Rising
Attorney, Agent, or Firm—Young & Thompson

[57] ABSTRACT

A method of repairing a water-cooled electrode holder for use in electric furnaces, of the type comprising a base and a bowl secured to the base for encompassing and supporting a vertical cylindrical electrode. Such holders suffer deterioration in the region of the inner surface of the bowl which is opposite the base. According to the invention, the outer semi-cylindrical portion of the bowl is cut off on a substantially diametral plane and replaced by a new portion. The new portion is formed from a flat slab of copper. To make the water passageways in the new portion match those in the old, a pattern of the locations of the passageways in the old portion is made and transferred to one end of the slab. The slab is then drilled lengthwise at the locations transferred from the pattern, and the holes are filled with sand and plugged. The slab is then bent to U-shape to comprise a semi-cylindrical portion having two straight ends thereon. The plugs are then removed from the straight end portions and the sand emptied, after which tongue and groove connections are machined on the old and new portions, which are then assembled and pinned together and welded.

12 Claims, 10 Drawing Figures

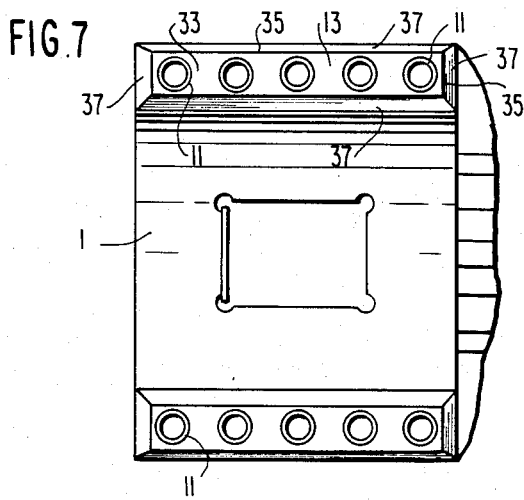
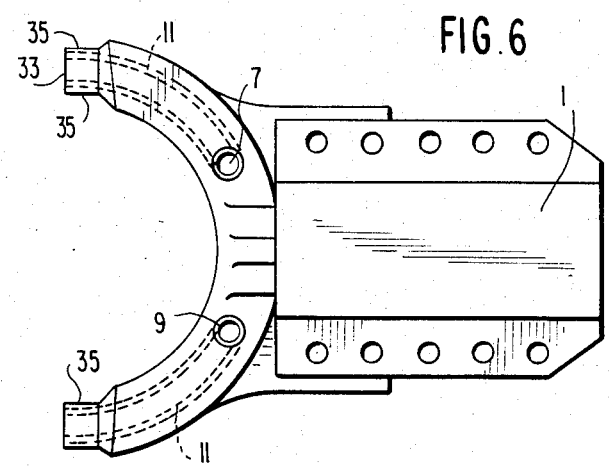
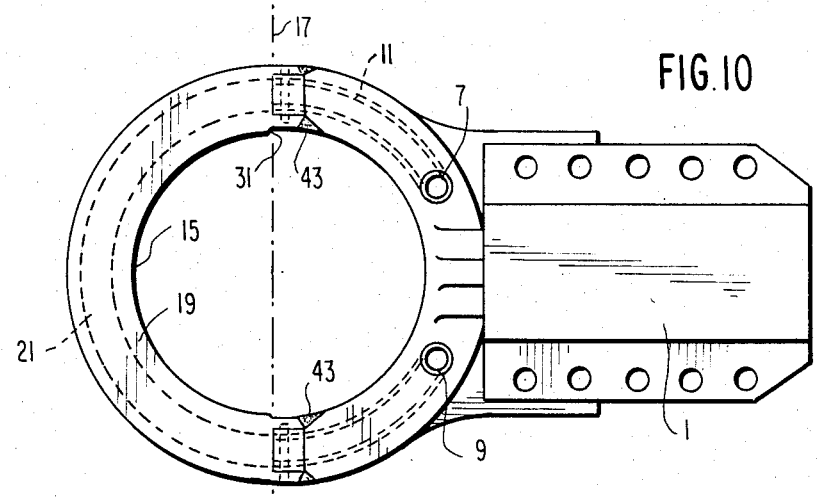
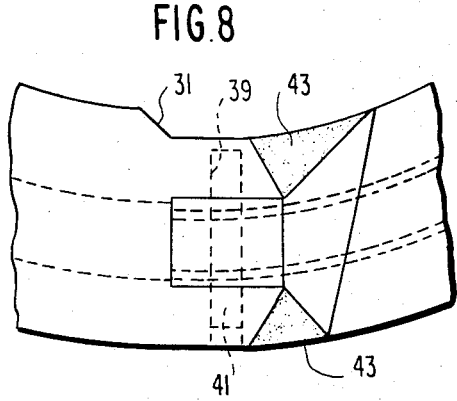
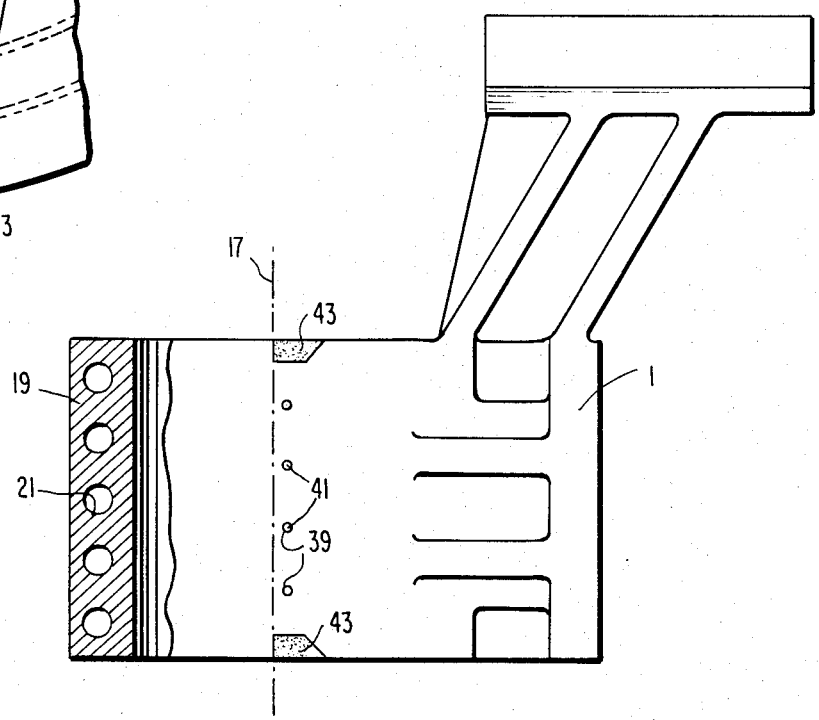

METHOD OF REPAIRING A WATER-COOLED ELECTRODE HOLDER

BACKGROUND OF THE INVENTION

Electric arc furnaces are characterized by a plurality of electrodes immersed in the molten metal. Each electrode has a holder which often is in the form of a cooper casting with cooling coils of a metal such as Monel or steel embedded in the casting. Copper is employed because of its low electrical resistivity and high heat conductivity.

The holders are characterized broadly by a base by which the holder and electrode are supported, and a bowl which is of general U-shape and surrounds and contacts the electrode. The base has a clamping portion which confronts the electrode and the bowl has a contact surface which confronts and contacts the electrode diametrically opposite the clamping portion of the base.

The contact surface of the bowl is subject to deterioration under the severe conditions of use and must be repaired from time to time. Various ways are known to repair this surface. Among these is the proposal of U.S. Pat. No. 3,151,202, that the deteriorated portion of the bowl be cut off on a diametral plane and scrapped and replaced by a new casting. In that earlier patent, the new casting is a semi-cylindrical casting of copper having a vertically elongated slot cast therein that extends about the full semi-cylindrical extent of the new portion. However, the resulting casting is only a shell and has no sufficient mass and is neither mechanically nor electrically sound. Moreover, the cast copper of such a repair piece is not dense enough to hold water at an elevated pressure and so the repair piece tends to leak. Finally, the cast slot which provides a water chamber is a large void without a flow pattern. Sediment accumulates at the bottom of the void, which keeps the water from contacting and cooling this area. In fact, however, this area is the most critical to the transfer of current to the electrode; and so the area that needs the most cooling receives the least.

It is accordingly an object of the present invention to provide a method of repairing an electrode holder of the type described, in which the heat exchange characteristics of the original holder will be substantially improved or will at least be unimpaired.

Another object of the present invention is the provision of such a method, in which the repair can be effected without performing a casting operation.

Still another object of the present invention is the provision of such a method, in which the repair can be effected using only commercially available materials.

It is also an object of the present invention to provide such a method of repair, which will be rapid and economical to perform, and whose repaired product will be rugged and durable in use.

SUMMARY OF THE INVENTION

The above and other objects of the present invention are achieved, by providing a method of repairing an electrode holder of the type comprising a base and a U-shaped slab of metal having a circuitous path for cooling water therethrough in the form of a plurality of passageways within the slab, the method comprising cutting off the U-shaped slab on a substantially diametral plane and replacing with a new portion the cut-off portion which is opposite the base. The new portion is formed from a flat slab of copper. The location of the passageways on the old portion, at the cut, is recorded on a pattern; and this pattern is transferred to one end of the flat slab. The flat slab is then through-drilled lengthwise at those marked locations, the drilled holes being larger in diameter than the passageways in the remaining original or old part. The drilled holes are then closed at one end and filled with sand and closed at the other end; and the slab is bent to U-shape with a substantially semi-cylindrical portion and two straight end portions. The plugs are then removed from the end portions and the sand dumped; and a tongue and groove connection is machined on the old and new parts, with the grooves in the ends of the new part and the tongues on the old part. In forming the tongues, when the old part includes embedded coils, the coils of the old part remain uncut; and in fact, a layer of copper is left on their flanks. Holes are then drilled through the tongue and groove joint, in alternation with the passageways; and metal pins are inserted in these holes and the tongue and groove joints welded to complete the repair.

BRIEF DESCRIPTION OF THE DRAWINGS

These and other objects, features and advantages of the present invention will become apparent from a consideration of the following description, taken in connection with the accompanying drawings, in which:

FIG. 6 is a top plan view of the old or base portion of the holder after its cut-off ends have been machined;

FIG. 7 is a left side view of FIG. 6, with parts broken away;

FIG. 8 is an enlarged fragmentary plan view of the completed joint between the old and new parts;

FIG. 9 is a side elevational view, with parts broken away, of the repaired holder; and FIG. 10 is a view similar to FIG. 1 but showing the repaired holder.

DETAILED DESCRIPTION OF THE INVENTION

Figure 1:
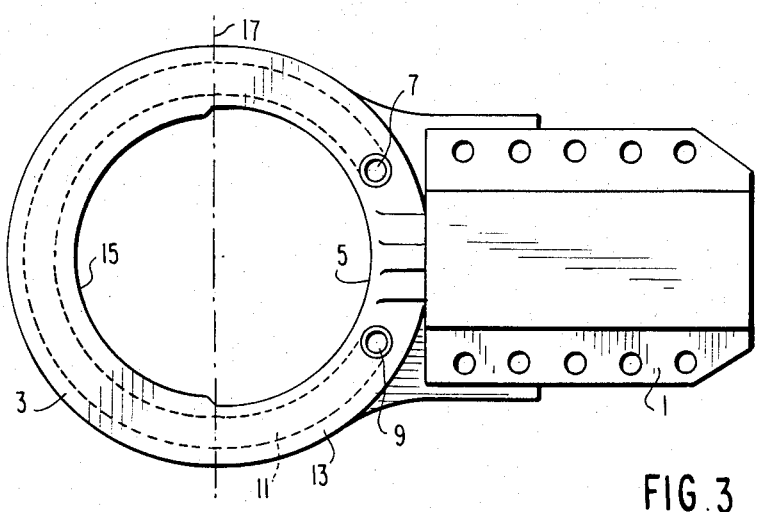
FIG. 1 is a top plan view of an electrode holder of the type to be repaired by the present invention.
Figure 2:
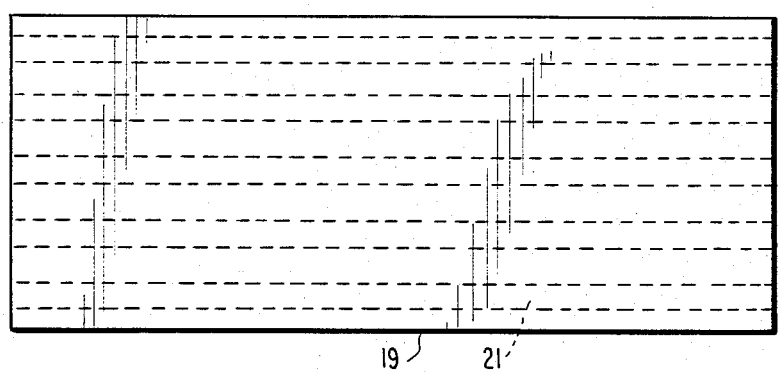
FIG. 2 is a plan view of the drilled flat slab, which, when bent, will constitute the replacement part.
Figure 3:
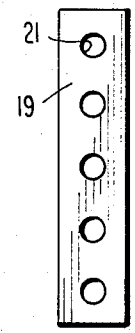
FIG. 3 is an end view of the slab of FIG. 2.

Referring now to the drawings in greater detail, there is shown in FIG. 1 an electrode holder of conventional construction, comprising a base 1 and a bowl 3 for supportingly surrounding a vertically elongated graphite electrode for use in electric furnace practice.

Base 1 has a clamping portion 5 which bears against the electrode. Base 1 and bowl 3 are water cooled and for this purpose are provided with a cooling water inlet 7 and a cooling water outlet 9 interconnected by vertically spaced coils 11 of Monel, steel, or other metal melting higher than copper, through which cooling water circulates in a circuitous path about the holder. The coils 11 are surrounded on all sides and embedded in a copper casting 13 which forms the body of the bowl.

Opposite base 1, bowl 3 has an inner contact surface 15 of generally semi-cylindrical configuration; and it is here that most of the deterioration occurs in use. To repair this deterioration, according to the present invention, the bowl is cut off on a substantially diametral plane 17 and the damaged portion to the left of that plane as seen in FIG. 1 is scrapped. By "substantially" we mean that although we ordinarily cut the bowl off on a diametral plane, nevertheless, it is possible to cut within a range of angles on opposite sides of 180°, for example 140° to 190°.

A new or replacement portion is then formed, starting from a heavy flat plate 19 of copper and which can be ordinary commercially available material. To form plate 19 as the replacement part, holes 21 are deep drilled therethrough from end to end in spaced parallel vertical relationship. These holes must match the pattern of the passageways through the original or remaining part, which in the illustrated embodiment is determined by the coils 11; and for this purpose, a pattern is made of the locations of coils 11 on the original or remaining part of the holder to the right of plane 17; and in fact, the pattern is made in plane 17. The pattern can be made in any of a number of simple ways, among them being placing sheet material such as paper over one of the cut-off ends of the base portion of the holder and marking the locations of the edges of the base portion as well as the locations of the coils 11. This pattern is then applied to the end of plate 19, where the locations of the edges serve to orient the pattern correctly relative to plate 19. The locations of the centers of coils 11 then serve as the locations of the centers of holes 21.

When drilling holes 21, however, it is important that their diameter be greater than the diameter of the interior of the coils 11. If the inner diameter of coils 11 is, say, 1¼", then that of holes 21 could suitably be, say, 1½". In this way, any possible misalignment and resulting reduction of the total cross-sectional area of the cooling water passageway, upon assembly of the parts as described hereinafter, will be avoided.

One end of each hole 21 is then plugged with a removable plug (not shown); and sand is packed in the holes 21 to fill them completely except for the end opposite the first plug, in which a second removable plug (also not shown) is then inserted. The plate 19 is then bent to the FIG. 4 configuration, in which most of the plate is semi-cylindrical except for the ends 23, which are straight. If the inner radius of the bent plate 19 were, for example, fourteen inches, then the length of straight ends 23 could be, for example, two inches. It is particularly to be noted that the portions of holes 21 occupied by the plugs are not bent but remain straight.

The use of sand as a filler and the bending of the plate, are discussed in greater detail in our U.S. Pat. No. 4,342,878, which issued Aug. 3, 1982 and the disclosure of which is incorporated herein by reference.

Figure 4:
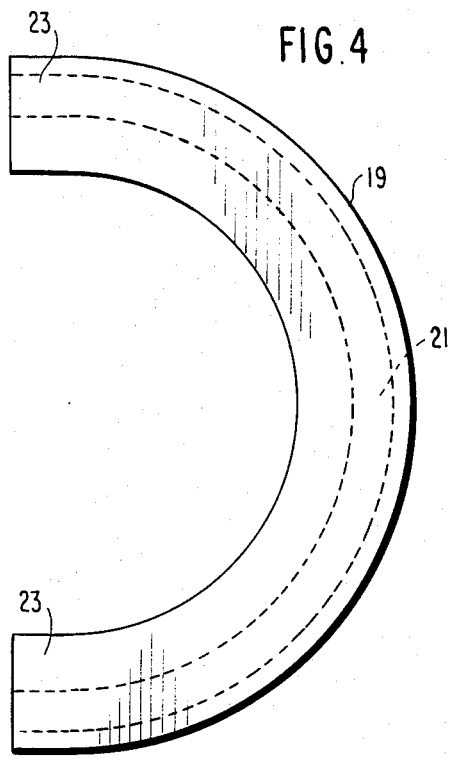
FIG. 4 is a top plan view of the slab of FIG. 2 after it has been bent.

Once the plate has been bent to its FIG. 4 configuration, the plugs are removed and the sand dumped from holes 21. The bent plate is now characterized by two flat end surfaces that are coplanar and in each of which a vertically spaced apart series of ends of holes 21 is disposed, the spacing and position of whose centers match the spacing and positioning of the centers of the coils 11 that remain in the retained original portion of the holder.

Figure 5:
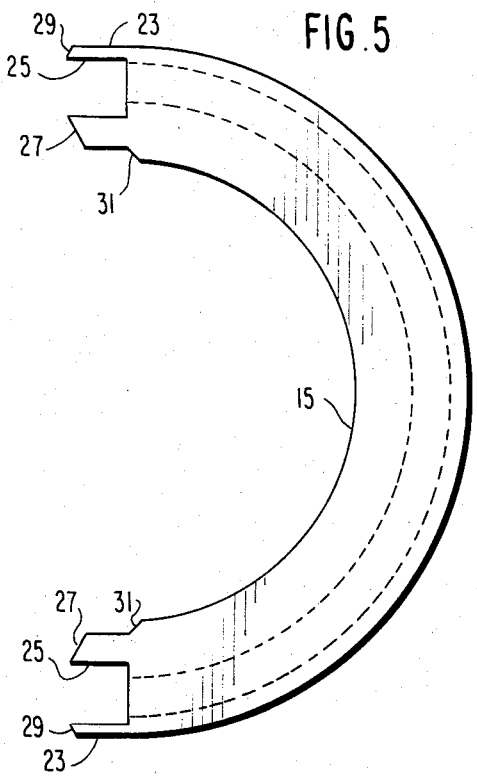
FIG. 5 is a view of the bent slab after its ends have been machined.

The ends 23 of the bent plate 19 are then machined as shown in FIG. 5, namely, by cutting vertical rectangular grooves 25 in the ends, and by providing bevels 27 and 29 on opposite sides of grooves 25 and bevels 31 that define the ends of clamping portion 15 of the replacement part.

The ends of the remaining or retained portion of the holder are also machined away from the plane 17, as seen in FIGS. 6 and 7. A tongue 33 having flat sides 35 perpendicular to plane 17 and to each other, each side terminating in a bevel 37, is machined on each end of the original portion. When forming sides 35, it is particularly to be noted that they are spaced away from the outer surfaces of embedded coils 11 by a predetermined but substantial distance, e.g. 1/16". Thus, sides 35 are all of copper and there is no exposed coil, the coils remaining embedded in what remains of the copper casting 13.

With the tongue and groove connection assembled, that is, with tongues 33 in grooves 25, horizontal holes 39 are then drilled through the tongue and groove connection in alternation with coils 11 and holes 21, as best seen in FIG. 8; and metal pins 41 are inserted through those holes to hold the assembly for welding. Copper welds 43 are then formed as shown in FIGS. 8 and 9, by welding, e.g. gas metal arc welding; and the completely repaired holder is shown in FIG. 10, ready to be used again.

It is particularly to be noted that the feature of leaving a layer of copper on the flanks of the ends of coils 11 in tongue 33, provides the advantages of enabling a copper-to-copper weld in this region and also reduces the possibility of leakage at this point. Thus, that remaining layer of copper provides in effect a cushion over the coils which protects the coils from being burnt through upon welding to interconnect the parts.

It is also to be noted that the invention is useful for the repair of electrode holders as disclosed in our above-identified patent, in which there are no embedded coils.

When the present invention is practiced with an electrode holder as in our above-identified patent, then the heat exchange characteristics of the original holder will be substantially unimpaired by the repair.

But when the present invention is practiced with the type of electrode holder which preceded that of our above-identified patent, namely, the type in which cooling coils 11 are embedded in a mass of cast copper, then the cooling efficiency of the holder is in fact substantially improved by the repair and the useful lifetime of the repaired holder, until the next repair is required, will actually be much longer than was the lifetime of the holder prior to the repair.

In view of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a method of repairing an electrode holder of the type comprising a base and a U-shaped slab of metal having a circuitous path for cooling water therethrough in the form of a plurality of passageways within the slab, the method comprising cutting off the U-shaped slab on a substantially diametral plane, and replacing with a new portion the cut-off portion of the holder on the side of said plane opposite said base; the improvement comprising forming said new portion from a flat slab of metal, recording on a pattern the locations of said passageways on the same side of said plane as said base, transferring said locations from said pattern to one end of said flat slab, drilling holes lengthwise through said slab at said transferred locations, bending said slab to U-shape, and securing the ends of the U-shaped slab to the base portion of the holder with the ends of said holes in communication with said passageways.

2. A method as claimed in claim 1, and drilling said holes to a diameter larger than the diamter of said passageways.

3. A method as claimed in claim 1, and forming tongue and groove joints between the ends of the slab and the base portion of the holder, and performing said securing by welding along said tongue and groove joints.

4. A method as claimed in claim 3, and drilling holes through said tongue and groove joints, and inserting pins through the latter holes to hold said base and said new portion together prior to welding.

5. A method as claimed in claim 4, in which said pin holes are disposed in alternation with said passageways and drilled holes.

6. A method as claimed in claim 3, in which said passageways are defined by coils of metal embedded in cast copper, and forming said tongues on said base by removing said copper on opposite sides of a tongue that contains end portions of said coils.

7. A method as claimed in claim 6, and, at the end of said removing step, leaving copper covering the sides of the embedded coils, whereby the flanks of said tongues are entirely of copper, and securing said slab and base portion together by welding.

8. In a method of repairing an electrode holder of the type comprising a base and a U-shaped slab of metal having a circuitous path for cooling water therethrough in the form of a plurality of passageways within the slab, the method comprising cutting off the U-shaped slab on a substantially diametral plane, and replacing with a new portion the cut-off portion of the holder on the side of said plane opposite said base; the improvement comprising forming said new portion from a flat slab of metal, drilling holes lengthwise through said slab at locations corresponding to the locations of said passageways, filling said holes with sand, plugging the ends of said holes, bending the slab to U-shape while maintaining the plugged ends of the slab straight, removing the plugs from the holes, and securing said new portion to the base portion of the holder with the ends of said holes in communication with said passageways.

9. A method as claimed in claim 8, and forming on said straight ends of said new portion and the confronting ends of said base, tongue and groove connections, and interengaging and welding together said tongue and groove connections.

10. A method as claimed in claim 9, and drilling holes through said tongue and groove connections, and inserting pins through the latter holes to hold said base and said new portion together prior to welding.

11. A method as claimed in claim 10, in which said pin holes are disposed in alternation with said passageways and drilled holes.

12. A method as claimed in claim 8, and drilling said holes to a diameter larger than the diameter of said passageways.

* * * * *